United States Patent [19]

Kerlin et al.

[11] Patent Number: 5,702,581
[45] Date of Patent: Dec. 30, 1997

[54] SIMPLIFIED PROCESS FOR PRODUCING A CORROSION-PROTECTING, WELL ADHERING LACQUER COATING AND THE WORKPIECES OBTAINED THEREBY

[75] Inventors: Klaus Gunter Kerlin, Haan; Peter Hamacher, Wuppertal, both of Germany

[73] Assignee: Herberts GmbH, Germany

[21] Appl. No.: 596,361

[22] PCT Filed: Aug. 31, 1994

[86] PCT No.: PCT/EP94/02872

§ 371 Date: May 23, 1996

§ 102(e) Date: May 23, 1996

[87] PCT Pub. No.: WO95/07319

PCT Pub. Date: Mar. 16, 1995

[30] Foreign Application Priority Data

Sep. 4, 1993 [DE] Germany ............... 43 40 002.2

[51] Int. Cl.$^6$ ............................................. C25D 13/20
[52] U.S. Cl. ................ 204/486; 204/495; 204/499; 204/504; 204/506
[58] Field of Search ................... 204/486, 499, 204/506, 504, 495

[56] References Cited

U.S. PATENT DOCUMENTS 4,673,444  6/1987  Saito et al. .................... 204/486
4,785,068  11/1988  Tominaga et al. .............. 528/45
5,066,689  11/1991  Patzschke et al. .............. 523/415
5,554,700  9/1996  Schipfer et al. ................ 204/506

FOREIGN PATENT DOCUMENTS 0 138 193  4/1985  European Pat. Off. .
0 509 437  10/1992  European Pat. Off. .
2449135  9/1980  France .
WO86/04931  8/1986  WIPO .

*Primary Examiner*—Kathryn L. Gorgos
*Assistant Examiner*—Kishor Mayekar
*Attorney, Agent, or Firm*—Merchant, Gould, Smith, Edell, Welter & Schmidt, P.A.

[57] ABSTRACT

A simplified process for producing a corrosion-protecting, well adhering lacquer coating, and the workpieces obtained thereby, is described. The process comprises

- subjecting a metal substrate to a pre-treatment by spray or dip phosphate treatment and without subsequent passivation treatment, optionally after a drying,
- carrying out an electrophoretic dip lacquer coating of the metal substrate treated in this way wherein an electro dip lacquer is used which contains bismuth in the form of an organic bismuth complex and/or a bismuth salt of an organic carboxylic acid in a content of 0.1 to 5 wt. % calculated as bismuth and related to the binder solids in the electro dip lacquer.

8 Claims, No Drawings

SIMPLIFIED PROCESS FOR PRODUCING A CORROSION-PROTECTING, WELL ADHERING LACQUER COATING AND THE WORKPIECES OBTAINED THEREBY

This application is a National Stage Application of PCT/EP94/02872, filed Aug. 31, 1994, which published as WO 95/07319 on Mar. 16, 1995.

BACKGROUND OF THE INVENTION

1. Field of the Invention

The invention relates to a process for coating metal substrates with a reduction of the process steps that are required, as well as the workpieces obtained thereby.

2. Description of the Prior Art

When outstanding corrosion protection is desired and good substrate adhesion of the lacquer coating produced by electrophoretic deposition is to be achieved the pre-treatment of metal substrates for a dip lacquer coating to be applied electrophoretically comprises a phosphate treatment and a passivating subsequent wash. The electro dip lacquer coating is then applied to this surface and stoved.

In series motor vehicle lacquering it has, for example, proved successful for the cleaned shells of galvanized or ungalvanized steel initially to be phosphated and then provided with a passivating subsequent wash before a so-called cathodic dip lacquer (CDL) is applied as a primer by cathodic deposition (see Glasurit-Handbuch der Lacke und Farben, p. 454 ff., 11th edition, 1984, Curt R. Vincentz Verlag Hanover). In this case the passivation step is a necessary component of the process.

In the last few years this basic process, which had been carried on in this way until today, has been constantly improved as regards the composition of phosphate treatment and passivating materials as well as the CDL materials. Phosphate treatment and passivating materials, for example, have been further developed as regards their technological properties and from ecological viewpoints, as Horst Gehmecker relates in JOT, Vol. 5, 1992, p. 42–46.

Alternative phosphate treatment processes such as iron phosphate treatment, zinc phosphate treatment, low-zinc phosphate treatment, tri-cation phosphate treatment, manganese-doped phosphate treatment, nickel-free phosphate treatment and nitrite-free phosphate treatment have become known, as the extensive patent literature demonstrates. Phosphate treatment solutions with a nickel ion content have proved particularly advantageous. Henkel markets commercial phosphate treatment products, for example, under the name Granodine®, such are Granodine 950, a tri-cation system, Granodine 1990, a nitrite-free tri-cation system, or Granodine 2700, a nickel-free tri-cation system.

The search for alternatives to the original passivation solutions, which contain chromate and are still conventional today, which are more acceptable from an ecological and health point of view has met with success as the patent literature shows, for example. Examples are passivation solutions based on zirconium fluoride or organically based. Henkel, for example, markets passivation products under the name Deoxylyte®, such as Deoxylyte 41, a chromate system, Deoxylyte 54 NC, a zirconium fluoride system or Deoxylyte 80, an organically based system.

Irrespective of the good properties regarding substrate adhesion and corrosion protection that can be achieved with the process described above, a disadvantage lies in the great deal of space required by the pre-treatment plants. Furthermore, when the various pre-treatment solutions are used a great deal of waste water is generated in the washing zones, and this requires complicated treatment.

A wide diversity of electro dip lacquers is known. Generally speaking they contain crosslinking catalysts, particularly in the form of heavy metal compounds. Lead or tin catalysts in particular have been used in practice.

Lead-free electro dip lacquers have also become known in more recent times, but they require improvement as regards their corrosion protection.

EP-A-138 193 describes the use of salts, specifically the acetates, preferably of divalent metals to improve the solubility of polymers. Bismuth is one of the metals mentioned. Improved lacquer film properties are not described.

SUMMARY OF THE INVENTION

The object of the invention is to provide a simplified process compared with the prior art for producing an electrophoretically lacquered metal substrate which guarantees outstanding corrosion protection and excellent substrate adhesion and in which the use of toxic auxiliary substances is extensively avoided.

It has been shown that this object can be surprisingly achieved by a process for lacquering metal substrates by means of phosphate treatment and electrophoretic dip coating, a process which the invention provides and which is characterized in that the metal substrate is subjected to a pre-treatment by spray or dip phosphate treatment and without subsequent passivation treatment, optionally after a drying, an electrophoretic dip lacquer coating of the metal substrate treated in this way is carried out wherein an electro dip lacquer is used which contains bismuth in the form of an organic bismuth complex and/or a bismuth salt of an organic carboxylic acid.

It is characteristic of the process according to the invention that no subsequent passivation treatment is carried out after the phosphate pre-treatment, nor are any further subsequent treatments required.

The invention also relates to the substrates produced according to the process according to the invention.

DETAILED DESCRIPTION OF THE INVENTION

The metal parts that are conventional in the motor industry can be used as metal substrates. Examples are components made of aluminium, magnesium or their alloys and particularly steel, e.g. ungalvanized or galvanized with pure zinc, zinc/nickel alloy or zinc/iron alloy. The different substrates can be jointly present in a workpiece (composite construction).

The phosphate treatment solutions that can be used in the process according to the invention are per se known. Those described by Horst Gehmecker in JOT, Vol. 5, 1992, p. 42–46 can be used for example. These are phosphate treatment materials containing zinc, manganese, iron and/or nickel. In the prior art, phosphate treatment solutions with a nickel ion content have proved to be particularly advantageous in industrial practice. In the context of the invention it has, however, been shown that the use of toxic nickel can be avoided as it offers no advantages which surpass the use of the electro dip lacquers which contain bismuth. The phosphate treatment coatings can be applied by spraying or dipping. A thin layer of phosphate crystals is deposited onto the surface of the metal substrate from these solutions. This layer should be as dense and fine-grained as possible. According to the invention it is not necessary to carry out a further subsequent treatment, such as a passivation treatment. It produces surprising advantages compared with the prior art in which a passivation was necessary after the phosphate coating had formed in order to obtain good corrosion protection. Passivation solutions which generally contained toxic chromium compounds had to be used. According to the invention it is also possible to avoid the chromium-free passivation solutions which have recently become available.

According to the invention the substrate can be dried after the phosphate treatment, for example, and conveyed for the subsequent dip lacquering.

In the process according to the invention, per se known electro dip lacquers which can be deposited on the anode or preferably electro dip lacquers that can be deposited cathodically and contain the organic bismuth compound contents according to the invention can be used as electro dip lacquers. There is no restriction. They may contain the conventional additives and catalysts. A preferred embodiment is, however, free from tin, chromium and/or lead compounds. Metal compounds which endanger health or the environment should be avoided.

The electro dip lacquers that can be used in the process according to the invention are aqueous coating agents with a solids content of 10–20 wt. % for example. They comprise conventional binders which have ionic substituents or ones which can be converted into ionic groups, as well as groups capable of chemical crosslinking, and optionally pigments and/or fillers and further additives. The ionic groups can be anionic groups or ones which can be converted into anionic groups, such as —COOH groups or cationic groups or basic groups which can be converted into cationic groups such as amino, ammonium, e.g. quaternary ammonium, phosphonium and/or sulphonium groups. Binders with basic groups are preferred. Basic groups containing nitrogen are particularly preferred. These groups can be present in quaternized form or they are converted into ionic groups with a conventional neutralizing agent such as an organic monocarboxylic acid, such as lactic acid, formic acid, acetic acid, with which the person skilled in the art will be familiar.

Examples of electro dip lacquer binders and lacquers which can be deposited anodically, contain anionic groups and can be used according to the invention are described in DE-A-28 24 418. They are, for example, binders based on polyesters, epoxy resin esters, poly(meth)acrylates, maleic oils or polybutadiene oils with a weight average of the molar mass of 300–10000 for example and an acid value of 35–300 mg KOH/g. The binders have —COOH, —SO$_3$H and/or —PO$_3$H$_2$ groups. The resins can be transferred into the aqueous phase after neutralization of at least a part of the acid groups. The lacquers can also contain conventional crosslinking agents such as triazine resins, crosslinking agents which contain groups capable of transesterification and/or transamidation or blocked polyisocyanates.

Cathodic electro dip lacquers (CDL) based on cationic and/or basic binders are, however, preferred. Examples of these basic resins are resins containing primary, secondary and/or tertiary amine groups, whose amine values are 20 to 250 mg KOH/g for example. The weight average of the molar mass ($M_w$) of the base resins is preferably 300 to 10000. Examples of such base resins are aminoacrylate resins, aminoepoxy resins, aminoepoxy resins with terminal double bonds, aminoepoxy resins with primary OH groups, aminopolyurethane resins, polybutadiene resins containing amino groups or modified epoxy resin/carbon dioxide/amine conversion products. These base resins may be self-crosslinking or they are used with known crosslinking agents in the mixture. Examples of such crosslinking agents are amino resins, blocked polyisocyanates, crosslinking agents with terminal double bonds, polyepoxy compounds or crosslinking agents which contain groups capable of transesterification and/or transamidation.

Examples of base resins and crosslinking agents used in cathodic dip lacquer (CDL) baths and which can be used according to the invention are described in EP-A-082 291, EP-A-234 395, EP-A-209 857, EP-A-227 975, EP-A-178 531, EP-A-333 327, EP-A-310 971, EP-A-456 270, U.S. Pat. No. 3,922,253, EP-A-261 385, EP-A-245 786, DE-33 24 211, EP-A-414 199, EP-A-476 514. These resins can be used alone or in a mixture.

In the process according to the invention the use of CDL baths according to EP-A-414 199 and those based on binders according to EP-A-234 395 have proved particularly successful.

In the invention, bismuth is used in the form of an organic bismuth complex or as the salt of an organic mono or polycarboxylic acid. Acetyl acetone may be quoted as an example of a chelating ligand. Other organic complexing agents with one or more complexing groups are, however, possible. Examples of suitable organic carboxylic acids from which bismuth salts which can be used in the process according to the invention derive are aromatic, araliphatic and aliphatic mono or dicarboxylic acids. The bismuth salts of organic monocarboxylic acids, particularly with more than two C-atoms, such as bismuth benzoate, propionate, octoate, neodecanoate are preferred. The bismuth salts of hydroxycarboxylic acids are particularly preferred in the process according to the invention. Examples are bismuth salicylate, bismuth-4-hydroxybenzoate, bismuth lactate, bismuth dimethylolpropionate. The bismuth salts of aliphatic hydroxycarboxylic acids are suitable in particular. The organic bismuth compound is selected to suit the lacquer. Organic bismuth salts can be particularly preferably incorporated into electro dip lacquers that can be deposited cathodically.

The quantity of the organic bismuth compound in the electro dip lacquer used according to the invention is preferably 0.1 to 5 wt %, particularly preferably 0.5 to 3.0 wt. %, calculated as bismuth and related to the binder solids of the electro dip lacquer bath. Care should be taken to ensure that the quantity of the optionally introduced carboxylate ions does not have a negative effect on the properties of the electro dip lacquer. In the electro dip lacquer which can be used according to the invention the organic bismuth compound can be present dissolved in the aqueous or in the disperse phase, finely divided, e.g. in colloidal form, or as ground powder. Preferably it should have an at least proportional solubility in water.

From the process technology point of view the process of electro dip lacquer coating is generally coupled with an ultrafiltration process. Water-soluble constituents from the electro dip lacquer pass through a membrane into the ultrafiltrate. The process according to the invention can be carried out using membrane-permeable organic bismuth compounds. Preferably, however, the organic bismuth compounds are selected from the bismuth compounds described above in such a way that only slight membrane-permeability is present at the pH values that prevail in the electro dip lacquer baths, i.e. in the process according to the invention the ultrafiltrate should be substantially free from bismuth compounds. A reduction of the bismuth content in the electro dip lacquer bath can be avoided in this way.

The organic bismuth compounds described above can be incorporated into the electro dip lacquer in different ways. For example, the organic bismuth compound can be added to the neutralized binder solution at elevated temperature, before substantial quantities of water as diluent are added, and then homogenized under agitation. In the case of binders neutralized with acids, the organic bismuth compound, preferably the organic bismuth salt, can be added stepwise at 60° to 80° C., for example, and then be homogenized under agitation at 60° to 100° C., preferably at 60° to 70° C., for several hours, preferably 4 to 8 hours.

If hydroxycarboxylic acids such as lactic acid or dimethylolpropionic acid are used as neutralizing agents for the binders, one can alternatively work with the corresponding quantities of bismuth oxide or hydroxide, wherein the corresponding bismuth salt is formed in situ. Compared with the first process mentioned in this case the quantity of acid should be adapted by the amount required for salt formation.

Furthermore the organic bismuth compounds can also be incorporated into the electro dip lacquer as a constituent of conventional pigment pastes for example. If they are water-soluble and/or are present dissolved in a solubilizer, the organic bismuth compounds can be added to the binder dispersion or the electro dip lacquer subsequently. Care should be taken to ensure, however, that there is uniform distribution in the electro dip lacquer bath.

The electro dip lacquer (EDL) coating agent may contain pigments, fillers and/or additives conventional to lacquers in addition to the base resins and optionally present crosslinking agents as well as the organic bismuth compound content that is essential to the invention. The conventional inorganic and/or organic pigments can be considered as pigments. Examples are carbon black, titanium dioxide, iron oxide, kaolin, talc or silicon dioxide. It is also possible to use conventional corrosion protection pigments. Examples of these are zinc phosphate, lead silicate or organic corrosion inhibitors. The type and quantity of the pigments depends on the intended application of the coating agents. If clear coatings are to be obtained, then no or only transparent pigments, such as micronized titanium dioxide or silicon dioxide, are used. If opaque coatings are to be applied, then colouring pigments are preferably contained in the electro dip lacquer bath.

The pigments can be dispersed to pigment pastes, e.g. using known paste resins. Such resins are familiar to the person skilled in the art. Examples of paste resins that can be used in CDL baths are described in EP-A-0 183 025 and EP-A-0 469 497.

The conventional additives for EDL coating agents are possible as additives. Examples are wetting agents, neutralizing agents, flow agents, catalysts, foam inhibitors and conventional solvents used in coating agents.

In the process according to the invention the metal substrate is cleaned and then subjected to a phosphate pre-treatment. No passivating subsequent treatment is carried out. Such phosphated, unpassivated metal sheets for experimental purposes are commonly available on the market and are marketed, for example, by Chemetall under the name Bonder® 26/W/OC (phosphate treatment containing nickel) or Bonder® 2640/W/OC (nickel-free phosphate treatment).

The phosphated substrate can then be dried, or it is directly subjected to the electro dip lacquering. After the coating with the electro dip lacquer containing bismuth the coating is crosslinked by storing. Subsequent coats can be applied when the lacquering applied according to the invention is used as primer.

By the process according to the invention a lacquer coat with excellent adhesion to the substrate and outstanding corrosion protection is obtained. Both phosphate treatment agents and electro dip lacquer can be free from environmentally hazardous metal compounds such as chromium, lead, nickel or tin compounds.

Compared with the above-mentioned prior art the process according to the invention is substantially simplified as a complete process step, viz. the passivation treatment, can be omitted without having to tolerate technological disadvantages.

EXAMPLE 1

(Production of Organic Bismuth Salts)

Deionized water and acid are presented and heated to 70° C. Common commercial bismuth oxide ($Bi_2O_3$) is added stepwise under agitation. After a further six hours' agitation at 70° C. the batch is cooled to approx. 20° C. and left for 12 hours with no agitation. Finally the precipitate is filtered off, washed with a small quantity of water and ethanol and dried at a temperature of 40°–60° C.

The following salts are produced using the proportions quoted:

Bismuth lactate: 466 parts (1 mol) of bismuth oxide+901 parts (7 mol) of lactic acid, 70% in water Bismuth dimethylol-propionate: 466 parts (1 mol) of bismuth oxide+938 parts (7 mol) of dimethylolpropionic acid+2154 parts of water

EXAMPLE 2

(Production of an Electro Dip Lacquer Containing Bismuth)

a) 570 g of an epoxy resin based on bisphenol A (epoxy equivalent 190) and 317 g of methoxypropanol are heated to 60° C., mixed with a mixture of 116 g of ethylhexylamine and 163 g of a polymer amine (see below) within two hours and reacted to an MEQ value of 2.06. 1330 g of a 75% solution of a bisphenol A epoxy resin (epoxy equivalent 475) in methoxypropanol are then added. A solution of 189 g of diethanolamine in 176 g of methoxypropanol is then added within one hour at 60° C. and the reaction carried on to an MEQ value of 1.57. Following further addition of a solution of 78 g of diethylaminopropylamine in 54 g of methoxypropanol within one hour, the reaction is carried on at 60° C. to an MEQ value of 1.46. The temperature is increased to 90° C. and then to 120° C. within a further hour. When a viscosity (GARDNER-HOLD; 6 g of resin+4 g of methoxypropanol) of I–J is achieved, dilution takes place with methoxypropanol to a solids content of 65 wt. %. The product has an amine value of 117 mg KOH/g and a hydroxyl value of 323 mg KOH/g, related to the solid in each case.

The polymer amine is produced by reacting 1 mol of diethylene triamine with 3.1 mol of 2-ethylhexylglycidylether and 0.5 mol of a bisphenol A epoxy resin (epoxy equivalent 190) in an 80% methoxypropanol solution. The product has a viscosity (DIN 53 211/20° C.; 100 g of resin+30 g of methoxypropanol) of 60 to 80 seconds.

b) 134 g of trimethylolpropane are mixed with 160 g of malonic diethylester and heated until distillation begins (approx. 140°–150° C.). 46 g of ethanol are distilled off as the temperature rises (to 180° C). When the reaction is completed, dilution with 128 g of diethyleneglycol dimethylether and cooling to 60° C. take place. 264 g of a reaction product from 1 mol of toluylene diisocyanate and 1 mol of ethyleneglycol monoethylether are added within four hours and reacted at 60° C. to an NCO content below 0.02 milliequivalent per g of sample.

The product obtained has a solids content of 80±2 wt. % (30 minutes, 120° C.), a viscosity to GARDNER-HOLD (10 g of product+2 g of diethyleneglycol dimethylether) of K and a refractive index n 20/d of 1.4960.

c) The products obtained under a) and b) are mixed in the ratio 70:30 (related to solids content). Lactic acid is then added, wherein the quantity required to achieve perfect solubility in water was determined in preliminary trials. Heating takes place to 70° C. and bismuth dimethylolpropionate is added stepwise under agitation within two hours in a quantity such that 1.5 wt. % of bismuth, related to solids content, is present in the batch. Agitation then continues for a further 6 hours at 60°–70° C., and then dilution with methoxypropanol to a solids content of 65 wt. %.

d) According to the formulation 100 parts of binder, 39.5 parts of titanium dioxide and 0.5 parts of carbon black, an electro dip lacquer that can be deposited cathodically and with an 18 wt. % solids content is produced in the conventional way.

EXAMPLE 3

(Production of CDL Dispersions)

a) 832 parts of the monocarbonate of an epoxy resin based on bisphenol A (commercial product Epicote 828) are mixed with 830 parts of a common commercial polycaprolactone polyol (commercial product CAPA 205) and 712 parts of diglycol dimethylether and brought to reaction at 70° to 140° C. with approx. 0.3% of $BF_3$ etherate until an epoxy value of 0 is achieved. 307 parts of a conversion product from 174 parts of toluylene diisocyanate (2 equivalents NCO) with 137 parts of 2-ethylhexanol are added to this product (solids 70%, 2 equivalents carbonate) at 40° to 80° C. in the presence of 0.3% of Zn-acetyl acetonate as catalyst, with the addition of 0.3% of benzyltrimethyl ammonium hydroxide (Triton B) with an NCO content of approx. 12.8%. Conversion takes place to an NCO value of approx. 0 and adjustment is then made to approx. 70% solids with diglycol dimethylether.

b) At 60° to 80° C., 618 parts of a conversion product from 348 parts of toluylene diisocyanate (80% 2,4 isomeric; 20% 2,6 isomeric) with 274 parts of 2-ethylhexanol are slowly added to 1759 parts of a biscarbonate of an epoxy resin based on bisphenol A (commercial product Epicote 1001®), with the addition of 0.3% of benzyltrimethyl ammonium hydroxide as catalyst with a residual NCO content of 12.8%, with catalysis of 0.3% of a non-ionic emulsifier (Triton B®). The reaction is continued to an NCO value of approx. 0. The product has a solids content of 70%. At a temperature of 20° to 40° C., 622 parts of the conversion product from 137 parts of 2-ethylhexanol with 174 parts of toluylene diisocyanate are added to 860 parts of bis-hexamethylene triamine dissolved in 2315 parts of methoxypropanol, with benzyltrimethyl ammonium hydroxide catalysis (0.3%) (NCO content approx. 12.8%) and reacted to an NCO content of approx. 0. 4737 parts of conversion product b) and 3246 parts of reaction product a) (each 70% in diglycol dimethylether) are then added and brought to reaction at 60° to 90° C. The reaction is terminated at an amine value of approx. 32 mg KOH/g. The product produced is distilled off in vacuo to a solids content of approx. 85%.

c1) Neutralization takes place with 30 mmol of formic acid/100 g of resin. Heating then takes place to 70° C. and bismuth lactate is added stepwise under agitation within two hours in a quantity such that 1.5 wt. % of bismuth, related to the solids content, are present in the batch. Agitation then continues for a further six hours at 60° to 70° C. After cooling transfer takes place into a dispersion with a solids content of 40 wt.% with deionized water.

c2) is repeated with the difference that there is no heating and no addition of bismuth salt after the formic acid has been added.

Production of Pigment Pastes

EXAMPLE 4

15 parts of acetic acid (50%), 30 parts of a conventional commercial wetting agent (50%) and 374 parts of deionized water are added to 223 parts of the paste resin according to EP-A-0 469 497 A1 Example 1 (55%) with the agitator at high speed.

Five parts of carbon black, five parts of pyrogenic silicic acid, 25 parts of dibutyltin oxide powder, 38 parts of lead silicate and 560 parts of titanium dioxide are added to this. Adjustment is made to approx. 50% solids with deionized water and grinding takes place in a bead mill. A stable pigment paste is produced.

EXAMPLE 5

Example 4 is repeated with no addition of lead silicate.

EXAMPLE 6

Example 5 is repeated with no addition of dibutyltin oxide.

EXAMPLE 7

(Production of a CDL Containing Bismuth)

4.5 parts of formic acid (50%) and 1760 parts of deionized water are added to 815.5 parts of the dispersion from Example 3 c1). 420 parts of pigment paste according to Example 6 are added under good agitation.

EXAMPLE 8

(Production of a CDL Containing Lead and Tin)

4.5 parts of formic acid (50%) and 1760 parts of deionized water are added to 815.5 parts of the dispersion from Example 3 c2). 420 parts of pigment paste according to Example 4 are added under good agitation.

EXAMPLE 9

(Production of a CDL Containing Tin)

Example 8 is repeated with the difference that 420 parts of the pigment paste from Example 5 are used.

EXAMPLE 10

(Production of a CDL Containing Lead and Tin)

According to EP-0 414 199-A2, Table 3, binder combination 2 a pigmented cataphoresis lacquer with a solids content of 18 wt. % is produced.

EXAMPLE 11

(Production of a CDL Containing Tin)

Example 10 is repeated without the addition of basic lead silicate. The cataphoresis lacquer contains 0.5 parts of carbon black, 35.5 parts of titanium dioxide, 5 parts of hexylglycol, each related to solid resin.

EXAMPLE 12

(Production of a CDL Containing Bismuth)

Example 11 is repeated with the difference that before the addition of the pigments and dilution with deionized water to a solids of 18 wt. %, heating takes place to 70° C. and bismuth lactate is added stepwise under agitation within two hours in a quantity such that 1.5 wt. % of bismuth, related to the solids content, are present in the batch.

The lacquers from Example 2 and 7 to 12 are applied in a 20 µm dry coat thickness by cathodic deposition to sheets of steel (ST 1405) electrolytically galvanized on one side and each with different pre-treatment (so-called "Bonder" sheets marketed by Chemetall for experimental purposes, cf. list below), and stored for 10 minutes at 175° C. (object temperature). After blanking half the side of the ungalvanized side, a conventional commercial filler is sprayed onto both sides in a 35 µm dry coat thickness and stored for 15 minutes at 165° C. (object temperature). A single-coat top coat lacquer which is suitable for series motor car lacquering is then spray-applied to both sides in a 40 µm dry coat thickness and stored for 30 minutes at 130° C. (object temperature). The blanking is then removed.

List of the various pre-treatments:

| | | |
|---|---|---|
| A | Bonder ® 26/60/0C | (tri-cation spray phosphate treatment containing nickel, chromic acid passivated) |
| B | Bonder ® 26/D6800/0C | (tri-cation spray phosphate treatment containing nickel, passivated with zirconium fluoride) |
| C | Bonder ® 2640/60/0C | (nickel-free tri-cation spray phosphate treatment, chromic acid passivated) |
| D | Bonder ® 26/W/0C | (tri-cation spray phosphate treatment containing nickel, no passivation, washed with water) |
| E | Bonder ® 2640/W/0C | (nickel-free tri-cation dip phosphate treatment, no passivation, washed with water). |

Tests carried out:

1. Test of corrosion protection to VDA Guideline 621-415 on the ungalvanized side, test duration 10 cycles, particulars of infiltration according to DIN 53 167 in mm (see Table 1).

2. Test of the adhesion to the series structure on the galvanized side according to DIN 53 151 before and after exposure to 240 hours of constant atmosphere according to DIN 50 017 (see Table 2).

TABLE 1

Corrosion protection test, values in mm

| Lacquer example | A | B | C | D | E |
|---|---|---|---|---|---|
| 2 | 1.3 | 1.3 | 1.3 | 1.4* | 1.3* |
| 7 | 1.2 | 1.2 | 1.2 | 1.4* | 1.3* |
| 8 | 1.3 | 1.3 | 1.3 | 3.5 | 1.9 |
| 9 | 1.2 | 1.3 | 1.2 | 3.8 | 2.1 |
| 10 | 1.1 | 1.1 | 1.1 | 2.3 | 1.8 |
| 11 | 1.4 | 1.4 | 1.4 | 3.3 | 2.4 |
| 12 | 1.1 | 1.3 | 1.2 | 1.3* | 1.3* |

TABLE 2

Test of adhesion by grid test before (b) and after (a) exposure to the constant atmosphere

| Lacquer example | A | | B | | C | | D | | E | |
|---|---|---|---|---|---|---|---|---|---|---|
| | b | a | b | a | b | a | b | a | b | a |
| 2 | 1 | 1 | 1 | 1 | 1 | 1 | 1* | 1* | 1* | 1* |
| 7 | 1 | 1 | 1 | 1 | 1 | 1 | 1* | 1* | 1* | 1* |
| 8 | 1 | 1 | 1 | 1 | 1 | 1 | 1 | 2 | 1 | 3 |
| 9 | 1 | 1 | 1 | 1 | 1 | 1 | 1 | 2 | 1 | 2 |
| 10 | 1 | 1 | 1 | 1 | 1 | 1 | 1 | 2 | 1 | 2 |
| 11 | 1 | 1 | 1 | 1 | 1 | 1 | 1 | 2 | 1 | 2 |
| 12 | 1 | 1 | 1 | 1 | 1 | 1 | 1* | 1* | 1* | 1* |

The values denoted by * in Tables 1 and 2 indicate the results achieved with the process according to the invention.

We claim:

1. A process for lacquering metal substrates with a phosphate treatment and electrophoretic dip lacquer coating without the use of environmentally hazardous metal compounds, comprising:

pretreating the metal substrate with a spray or dip phosphate treatment solution without passivation treatment and without toxic metal compounds, to produce a non-passivated, phosphated-coated, metal substrate without toxic metal compounds in the phosphated coating, and coating the phosphate-coated metal substrate with an electrophoretic dip lacquer which contains a bismuth compound of bismuth lactate, bismuth dimethylolpropionate or a combination thereof and is free from tin and lead compounds, wherein the bismuth compound is present in the lacquer to produce a lacquered metal substrate with significant corrosion protection and substrate adhesion.

2. A process according to claim 1, wherein the electrophoretic dip lacquer further contains binder resins, wherein the bismuth compound comprises from 0.1 to 5% by weight of bismuth based on solids content of the binder resins.

3. A process according to claim 1, wherein the phosphate treatment solution is free from nickel ions.

4. A process according to claim 1, wherein the electrophoretic dip lacquer is a cathodic electrophoretic dip lacquer based on self-crosslinking or non-self-crosslinking binders with primary, secondary, tertiary amino groups, or a combination thereof corresponding to an amine value of 20 to 250 mg KOH/g and a weight average molecular weight (Mw) of 300 to 10000, whose amino groups are present at least partially quaternized, neutralized, or a combination thereof.

5. A process according to claim 1, wherein the metal substrate is selected from the group consisting of motor vehicle bodies and their component parts.

6. A process according to claim 1, wherein the electrophoretic dip lacquer coating is a primer coating of the metal substrate of motor vehicle bodies and their component parts as part of a multi-coat lacquering.

7. A process according to claim 1, wherein the metal substrates are composed of different metals.

8. A process according to claim 1, wherein the metal substrate is a metal workpiece.

* * * * *

UNITED STATES PATENT AND TRADEMARK OFFICE
CERTIFICATE OF CORRECTION

PATENT NO. : 5,702,581

DATED : DECEMBER 30, 1997

INVENTOR(S) : KERLIN ET AL.

It is certified that error appears in the above-identified patent and that said Letters Patent is hereby corrected as shown below: On the title page,:

Item [30] Foreign Application Priority Data: "43 40 002.2" should read —P 43 30 002.2—

Col. 6, line 1: "storing" should read —stoving—

Col. 8, line 22: insert —c1)— before the words "is repeated"

Col. 9, line 32: "stored" should read —stoved—

Col. 9, line 35: "stored" should read —stoved—

Col. 9, line 39: "stored" should read —stoved—

Signed and Sealed this

Sixth Day of July, 1999

*Attest:*

Q. TODD DICKINSON

*Attesting Officer*     *Acting Commissioner of Patents and Trademarks*